United States Patent Office 3,228,955
Patented Jan. 11, 1966

3,228,955
CERTAIN SUBSTITUTED OXAZOLIDINONES AND PYRROLIDINONES
Richard A. Hickner, Midland, Mich., assignor to The Dow Chemical Company, Midland, Mich., a corporation of Delaware
No Drawing. Filed Jan. 18, 1962, Ser. No. 167,481
5 Claims. (Cl. 260—307)

This invention is directed to new heterocyclic sulfides corresponding to the formulas:

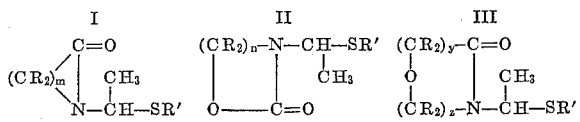

In this and succeeding formulas, $m=3$ or 4, $n=2$ or 3, $y=1$ or 2 and $z=1$ or 2 with $y+z$ equal to two or three, R represents hydrogen and/or an alkyl radical containing 1 to 4 carbon atoms, inclusive, and R' represents an alkyl, cycloalkyl, aryl or heterocyclic radical.

The compounds of this invention are high boiling point liquids which are soluble in many organic solvents and insoluble in water. The lower molecular weight compounds have a slightly disagreeable odor. These compounds have demonstrated use as defoamers and plasticizers for polyvinyl chloride plastics. The method of formation of these new compounds provides a convenient process for removal of mercaptan impurities in liquid mixtures by conversion of the mercaptans to these higher boiling point compounds.

The compounds of this invention are prepared by utilizing a strong protonic acid or acid producing substance, such as thionyl chloride, to catalyze the addition reaction of mercaptans with N-vinyllactams or N-vinyl cyclic carbamates. The general reaction may be represented by the equations:

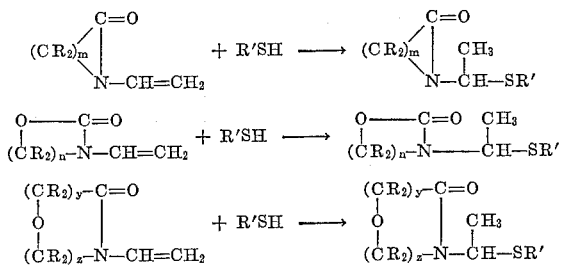

The reaction, which is rapid and exothermic, is carried out by placing the reaction components in a non-reactive liquid solvent and introducing the acidic catalytic component into the mixture until the reaction commences. Non-reactive liquid aliphatic and aromatic hydrocarbons, and their halogenated analogues, e.g. benzene, methylene chloride, chloroform, and dioxane, which dissolve the reactants, may be employed. Alternatively, a solution of the mercaptan may be acidified and the N-vinyl compound added dropwise, or, a mixture of the mercaptan and N-vinyl component may be added dropwise to the acidified solvent. After completion of addition of the components, the continuously stirred reaction mixture is post-reacted for an additional period of time, sufficient to complete the reaction through depletion of one of the reactants, before neutralization of the acid and removal of any precipitate by filtration. Completion of the reaction may be determined by testing the reaction mixture for the presence of one of the reactants. As an example, the presence of N-vinyl starting material will be confirmed by the loss of color of a drop of 0.1 percent by weight of iodine solution introduced into a small aliquot of the reaction mixture. The solvent is then removed by distillation and the remaining solution is devolatilized at 100° C. under a pressure of about 1 mm. leaving the reaction product as the remaining material.

An excess of either of the two reactants may be used although equimolar quantities are preferred.

The acids which may be employed as catalysts are any strong, non-oxidizing, protonic acids such as sulfuric, trichloroacetic, toluenesulfonic acids, and bisulfates of alkali metals or ammonia. Acid producing compounds such as thionyl chloride and phosphorous trichloride may be similarly used. The amount of acid used is preferably only that necessary to initiate the reaction; an amount ordinarily falling within a range of 0.01–5 percent by weight of the reactants.

The mercaptans which may be employed correspond to the formula R'SH wherein R' represents an alkyl, cycloalkyl, aryl or heterocyclic group.

The following examples illustrate the present invention but are not to be considered as limiting thereof.

*Example 1.*—*1-[1-(dodecylthio)ethyl]-2-pyrrolidinone*

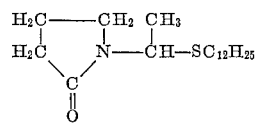

A reaction flask, fitted with a reflux condenser, stirrer, thermometer and gas inlet tube, and provided with external cooling means was charged with 33.3 g. (0.3 mole) of N-vinyl pyrrolidinone, 60.6 g. (0.3 mole) of lauryl mercaptan and 200 ml. of benzene. Hydrogen chloride gas was sparged in until the reaction commenced. The reaction temperature rose to 47° C. over a fifteen minute period. The mixture was stirred for an additional three hours, neutralized with anhydrous ammonia and filtered to remove the small amount of precipitate present. The benzene was distilled off and the mixture devolatilized by heating to 100° C. at a pressure of approximately 1 mm. The crude product weighed 83 g., which is equivalent to a theoretical yield of 88 percent, and had a refractive index of $n_D^{30}=1.4824$. A portion of the product, flashed through a short path still to remove residual impurities, had a boiling point of 155–165° C. at 0.2 mm. pressure, a light yellow color and a refractive index, $n_D^{30}=1.4824$. Analysis of the product showed 69.10 percent carbon and 11.23 percent hydrogen compared to a theoretical composition calculation of 68.95 percent carbon and 11.17 percent hydrogen.

*Example 2.*—*3-[1-(dodecylthio)ethyl]-5-methyl-2-oxazolidinone*

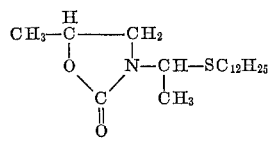

A solution of 60.6 g. (0.3 mole) of lauryl mercaptan, 38.1 g. (0.3 mole) of N-vinyl-5-methyl-2-oxazolidinone and 200 ml. of benzene was treated with a catalytic amount of hydrogen chloride gas following a procedure similar to Example 1. The temperature rapidly rose to 48° C. Stirring was continued during a post-reaction period of 2½ hours. Neutralization, filtration and removal of volatiles as in Example 1 yielded 70 g. of the desired product which is equivalent to a theoretical yield of 71 percent. The product, a light yellow liquid which did not boil at a temperature of 160° C. at 0.5 mm. pressure, had a refractive index $n_D^{25}=1.4752$. Analysis showed 65.70 percent carbon and 10.70 percent hydrogen compared to a theoretical composition calculation of 65.60 percent carbon and 10.71 percent hydrogen.

Example 3.—3-[1-(3-methylbutylthio)ethyl]-5-ethyl-2-oxazolidinone

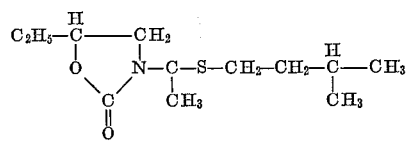

A quantity of 35 g. (0.25 mole) of N-vinyl-5-ethyl-2-oxazolidinone was dissolved in 100 ml. of methylene chloride and the solution cooled to 7° C. in an ice bath. Five drops of concentrated sulfuric acid was added to the solution followed by the dropwise addition of 25 g. (0.24 mole) of 3-methyl-1-butane-thiol with the solution temperature rising to 24° C. The ice bath was removed and five more drops of concentrated sulfuric acid was added to the solution. After stirring the reaction mixture for three hours, anhydrous sodium carbonate was added to neutralize the solution. The sodium carbonate was removed by filtration and the desired product was isolated by distillation removal, at reduced pressure, of the solvent and unreacted starting materials. A quantity of 20 g. (30 percent yield) of the desired product remained as a colorless liquid which distilled at 130–140° C. under 0.15 mm. pressure and had a refractive index $n_D^{25}=1.4804$. Analysis showed 58.84 percent carbon and 9.20 percent hydrogen compared to a theoretical composition calculation of 58.73 percent carbon and 9.45 percent hydrogen.

Example 4.—3-[1-(phenylthio)ethyl]-5-methyl-2-oxazolidinone

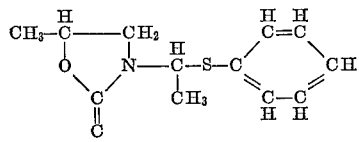

A quantity of 25.4 g. (0.2 mole) of N-vinyl-5-methyl-2-oxazolidinone and 22.0 g. (0.2 mole) of benzenethiol were dissolved in 100 ml. of chloroform at 25° C. Five drops of thionyl chloride was added to the solution causing a rapid temperature rise to 47° C. The mixture was stirred for two hours and then neutralized with anhydrous sodium carbonate. After removal of the drying agent by filtration, the solvent and unreacted starting materials were removed by distillation at reduced pressure leaving the desired product as a pale yellow liquid having a refractive index $n_D^{25}=1.5570$. The product yield was 35 g. (75 percent). Analysis showed 60.47 percent carbon and 6.43 percent hydrogen compared to a theoretical composition calculation of 60.73 percent carbon and 6.37 percent hydrogen.

Analogous compounds are prepared by methods similar to those detailed in Examples 1 through 4 by substitution of N-vinyllactams or N-vinyl cyclic carbamates, e.g. their ring-substituted propyl or butyl homologues, for the specific N-vinyl heterocyclics employed in the above examples. Further analogous compounds may be prepared by substitution of mercaptans, corresponding to the formula R′SH wherein R′ represents a member of the group consisting of alkyl radicals containing from one to twenty carbon atoms, cycloalkyl radicals containing from five to six carbon atoms and aryls substituted by from zero to three alkyl radicals each containing from one to four carbon atoms, for the specific mercaptans employed in the above examples.

The utility of the compounds of this invention as plasticizers is shown by the data in the following table. The tests were made on polymeric compositions comprising 100 g. of polyvinyl chloride, 64 g. of the below-designated plasticizer, 50 g. of diatomaceous earth, 3 g. of titanium dioxide and 3 g. of a barium-cadmium stabilizer. The material, which was readily converted into white, flexible, flash moldings, was tested for tensile strength and elongation properties using a Scott model P–4 tester while a Shore-Durometer was used to determine sample hardness.

| Plasticizer | Tensile Strength | Elongation | Shore A 10 sec. hardness |
|---|---|---|---|
| 1-[1-(dodecylthio)ethyl]-2-pyrrolidone | 1,860 | 405 | 69 |
| 3-[1-(dodecylthio)ethyl]-5-methyl-2-oxazolidinone | 2,150 | 395 | 70 |

I claim:
1. A heterocyclic sulfide of the formula

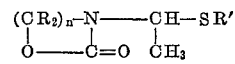

wherein R represents a radical selected from the group consisting of hydrogen, and one to four carbon alkyl groups, inclusive; R′ represents a member of the group consisting of alkyl radicals containing from one to twenty carbon atoms, and phenyl, and $n$ is two.

2. 1-[1-(dodecylthio)ethyl]-2-pyrrolidinone.
3. 3-[1-(dodecylthio)ethyl]-5-methyl-2-oxazolidinone.
4. 3 - [1 - (3-methylbutylthio)ethyl]-5-ethyl-2-oxazolidinone.
5. 3 - [1-(phenylthio)ethyl]-5-methyl-2-oxazolidinone.

References Cited by the Examiner

UNITED STATES PATENTS

| | | | |
|---|---|---|---|
| 2,656,328 | 10/1953 | Caldwell | 260—307.3 |
| 2,847,416 | 8/1958 | Gever | 260—307.3 |
| 2,868,801 | 1/1959 | Steele | 260—307.3 |
| 2,939,868 | 6/1960 | Carlson | 260—326.5 |
| 2,962,504 | 11/1960 | Walker et al. | 260—326.5 |
| 3,072,652 | 1/1963 | Hickner et al. | 260—307.3 |
| 3,072,672 | 1/1963 | Hickner et al. | 260—307.3 |

OTHER REFERENCES

Shostakovskii et al.: Chem. Abstracts, vol. 55, page 22122 (1961).

Shostakovskii et al.: Chem. Abstracts, vol 53, col. 18937 (1959).

NICHOLAS S. RIZZO, *Primary Examiner.*

DUVAL T. McCUTCHEN, *Examiner.*